US011603097B2

(12) United States Patent
Lee

(10) Patent No.: US 11,603,097 B2
(45) Date of Patent: Mar. 14, 2023

(54) APPARATUS FOR CONTROLLING PLATOONING DRIVING, VEHICLE SYSTEM HAVING THE SAME AND METHOD THEREOF

(71) Applicants: Hyundai Motor Company, Seoul (KR); Kia Corporation, Seoul (KR)

(72) Inventor: Chanhwa Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/509,317

(22) Filed: Oct. 25, 2021

(65) Prior Publication Data

US 2022/0289194 A1 Sep. 15, 2022

(30) Foreign Application Priority Data

Mar. 12, 2021 (KR) .......................... 10-2021-0032846

(51) Int. Cl.
*B60W 30/165* (2020.01)
*G08G 1/00* (2006.01)
*B60W 50/00* (2006.01)

(52) U.S. Cl.
CPC .......... *B60W 30/165* (2013.01); *B60W 50/00* (2013.01); *G08G 1/22* (2013.01); *B60W 2050/0012* (2013.01); *B60W 2554/4042* (2020.02); *B60W 2554/802* (2020.02); *B60W 2554/804* (2020.02); *B60W 2556/65* (2020.02); *B60W 2710/1005* (2013.01)

(58) Field of Classification Search
CPC .... B60W 30/165; B60W 30/16; B60W 50/00; B60W 2554/804; B60W 2554/4042; B60W 2554/802; B60W 2556/65; B60W 2050/0012; B60W 2710/1005; G08G 1/22
See application file for complete search history.

(56) References Cited

U.S. PATENT DOCUMENTS

| 9,604,526 B2 * | 3/2017 | Gauthier | B60K 6/365 |
| 10,053,088 B1 * | 8/2018 | Askeland | B60W 40/109 |
| 2017/0227972 A1 * | 8/2017 | Sabau | G05D 1/024 |

OTHER PUBLICATIONS

Turri et al., "Gear management for fuel-efficient heavy-duty vehicle platooning," *2016 IEEE 55th Conference*, pp. 1687-1694 (Dec. 12-14, 2016).

* cited by examiner

*Primary Examiner* — Edwin A Young
(74) *Attorney, Agent, or Firm* — Morgan, Lewis & Bockius LLP

(57) ABSTRACT

A platooning control apparatus may include a processor configured to detect the occurrence of acceleration and shifting of a vehicle in front of a host vehicle based on information received from the vehicle in front during platooning, and to set a feedforward control input value of a host vehicle to zero for controlling an inter-vehicle distance with the vehicle in front in a section in which the acceleration and the shifting of the vehicle in front occurs; and a storage configured to store data and algorithms driven by the processor.

20 Claims, 6 Drawing Sheets

APPARATUS FOR CONTROLLING PLATOONING DRIVING, VEHICLE SYSTEM HAVING THE SAME AND METHOD THEREOF

CROSS-REFERENCE TO RELATED APPLICATION

The present application claims priority to Korean Patent Application No. 10-2021-0032846, filed on Mar. 12, 2021, the entire contents of which is incorporated herein for all purposes by this reference.

BACKGROUND OF THE INVENTION

Field of the Invention

The present invention relates to a platooning control apparatus, a vehicle system including the same, and a method thereof, and more particularly, to a control strategy according to gear change during platoon driving.

Description of Related Art

A technique for moving vehicles by autonomous driving without user manipulation are being developed. As one of such methods, there is platooning autonomous driving in which multiple vehicles are driven in platooning groups and autonomously travels when they drive in a same path.

Such platooning driving may be performed by use of vehicle-to-vehicle communication and vehicle recognition sensors. That is, information for platooning control may be transmitted and received through the vehicle-to-vehicle communication, and the platooning control may be performed by grasping distances between vehicles, positions thereof, etc. through recognition sensors such as radars, riders, and cameras of each vehicle.

The distance between platooning vehicles is kept as short as possible to maximize a fuel efficiency effect. However, in a section in which gear shifting occurs, there may be a problem that the distance between vehicles unexpectedly increases or decreases, and thus fuel efficiency consumption of platooning may increase.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a platooning control apparatus, a vehicle system including the same, and a method thereof, configured for rapidly and stably perform intervehicle distance control for a rear vehicle by setting a feedforward control value of a host vehicle to 0 and then smoothly increasing the feedforward control of the rear vehicle from 0 to a required acceleration value of a vehicle in front at a time point when a shift is end in the case where the vehicle in front performs the shift while accelerating during platooning.

The technical objects of the present invention are not limited to the objects mentioned above, and other technical objects not mentioned may be clearly understood by those skilled in the art from the description of the claims.

Various aspects of the present invention are directed to providing a platooning control apparatus including: a processor configured to detect the occurrence of acceleration and shifting of a vehicle in front of a host vehicle based on information received from the vehicle in front during platooning, and to set a feedforward control input value of a host vehicle to zero for controlling an inter-vehicle distance with the vehicle in front in a section in which the acceleration and the shifting of the vehicle in front occurs; and a storage configured to store data and algorithms driven by the processor.

In various exemplary embodiments of the present invention, the processor may gradually increase the feedforward control input value of the host vehicle such that the feedforward control input value of the host vehicle reaches a required acceleration received from the vehicle in front in real time when the shifting of the vehicle in front is finished.

In various exemplary embodiments of the present invention, the processor may determine that the vehicle in front is in an acceleration situation when a required acceleration of the vehicle in front received from the vehicle in front is greater than 0.

In various exemplary embodiments of the present invention, the processor may determine that the shifting occurs when a gear command value of the vehicle in front received from the vehicle in front and engaged gear information of the vehicle in front do not match each other.

In various exemplary embodiments of the present invention, the processor may set the feedforward control input value of the host vehicle as a required acceleration of the vehicle in front when the vehicle in front is running at a constant speed, decelerating, or is not when the shifting has occurred.

In various exemplary embodiments of the present invention, the processor may set and change a required acceleration of the vehicle in front received from the vehicle in front to zero to set the feedforward control input value of the host vehicle to zero in the section where the acceleration and shifting of the vehicle in front occurs.

In various exemplary embodiments of the present invention, the processor may compare a value obtained by multiplying a maximum jerk value of the host vehicle by an elapsed time after the shifting is completed with a required acceleration of the vehicle in front immediately after the shifting is ended.

In various exemplary embodiments of the present invention, the processor may increase the feedforward control input value of the host vehicle to reach the required acceleration of the vehicle in front when the value obtained by multiplying the maximum jerk value of the host vehicle by the elapsed time after the shifting is completed has not reached the required acceleration of the vehicle in front.

In various exemplary embodiments of the present invention, the processor may set the feedforward control input value based on a required acceleration of the vehicle in front depending on acceleration and shifting situations of the vehicle in front, and may perform feedback control by use of the intervehicle distance with the vehicle in front.

In various exemplary embodiments of the present invention, it may further include a communication device configured to perform V2V communication between platooning vehicles.

Various aspects of the present invention are directed to providing a vehicle system including: a platooning control apparatus configured to detect occurrence of acceleration and shifting of a vehicle in front of a host vehicle based on information received from the vehicle in front during platooning, and to set a feedforward control input value of the host vehicle to zero for controlling an intervehicle distance with the vehicle in front in a section in which the acceleration and the shifting of the vehicle in front occurs; and a driving device configured to control the vehicle depending on the feedforward control input value of the host vehicle to keep the intervehicle distance with the vehicle in front.

In various exemplary embodiments of the present invention, it may further include a sensing device configured to detect the intervehicle distance with the vehicle in front.

In various exemplary embodiments of the present invention, the platooning control apparatus may set the feedforward control input value based on a required acceleration of the vehicle in front depending on acceleration and shifting situations of the vehicle in front, and may perform feedback control by use of the intervehicle distance with the vehicle in front.

In various exemplary embodiments of the present invention, the platooning control apparatus may gradually increase the feedforward control input value of the host vehicle such that the feedforward control input value of the host vehicle reaches a required acceleration received from the vehicle in front in real time when the shifting of the vehicle in front is finished.

Various aspects of the present invention are directed to providing a platooning control method including: detecting occurrence of acceleration and shifting of a vehicle in front of a host vehicle based on information received from the vehicle in front during platooning; and setting a feedforward control input value of the host vehicle to zero for controlling an intervehicle distance with the vehicle in front in a section in which acceleration and shifting of the vehicle in front occurs.

In various exemplary embodiments of the present invention, the detecting of the occurrence of acceleration and shifting of the vehicle in front may include receiving required acceleration of the vehicle in front, a gear command value of the vehicle in front, and engaged gear information of the vehicle in front from the vehicle in front.

In various exemplary embodiments of the present invention, the detecting of the occurrence of acceleration and shifting of the vehicle in front determining an acceleration situation of the vehicle in front based on required acceleration of the vehicle in front; and determining a shifting situation of the vehicle in front by use of the gear command value of the vehicle in front and the engaged gear information of the vehicle in front.

In various exemplary embodiments of the present invention, the method may further include gradually increasing the feedforward control input value of the host vehicle such that the feedforward control input value of the host vehicle reaches a required acceleration received from the vehicle in front in real time when the shifting of the vehicle in front is finished.

In various exemplary embodiments of the present invention, the gradually increasing of the feedforward control input value of the host vehicle may include: comparing a value obtained by multiplying a maximum jerk value of the host vehicle by an elapsed time after the shifting is completed with a required acceleration of the vehicle in front immediately after the shifting is ended; and increasing the feedforward control input value of the host vehicle to reach the required acceleration of the vehicle in front when the value obtained by multiplying the maximum jerk value of the host vehicle by the elapsed time after the shifting is completed has not reached the required acceleration of the vehicle in front.

In various exemplary embodiments of the present invention, the method may further include setting the feedforward control input value of the host vehicle as a required acceleration of the vehicle in front when the vehicle in front is running at a constant speed, decelerating, or is not when the shifting has occurred.

According to the present technique, it is possible to rapidly and stably perform intervehicle distance control for a rear vehicle by setting a feedforward control value of a host vehicle to 0 and then smoothly increasing the feedforward control of the rear vehicle from 0 to a required acceleration value of a vehicle in front at a time point when a shift is end in the case where the vehicle in front performs the shift while accelerating during platooning.

Furthermore, various effects which may be directly or indirectly identified through the present specification may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. illustrates a diagram for describing a platooning situation and a V2V communication situation according to various exemplary embodiments of the present invention.

Figure 1:
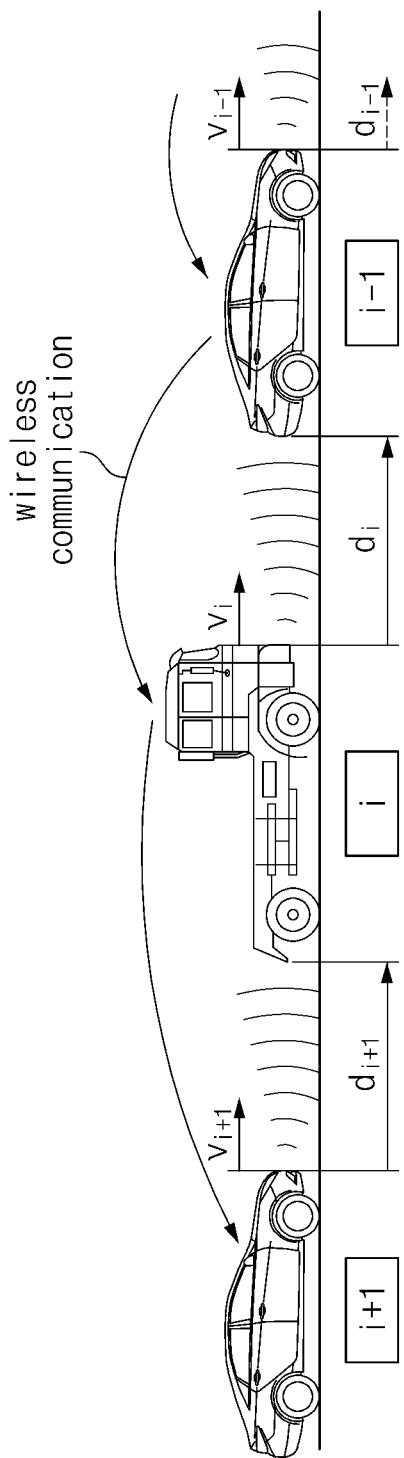

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the exemplary embodiment of the present invention.

Hereinafter, various exemplary embodiments of the present invention will be described in detail with reference to FIG. 1 to FIG. 6.

FIG. 1 illustrates a diagram for describing a platooning situation and a V2V communication situation according to various exemplary embodiments of the present invention.

A leading vehicle LV and following vehicles FV included in a platooning vehicle group may perform platooning on a road. The leading vehicle LV and the following vehicles FV may be driven while maintaining a predetermined distance. While driving, the leading vehicle LV or the following vehicles FV may adjust a distance between the leading vehicle LV and the following vehicles FV based on sensor information and platooning information shared through V2V communication.

Figure 2:
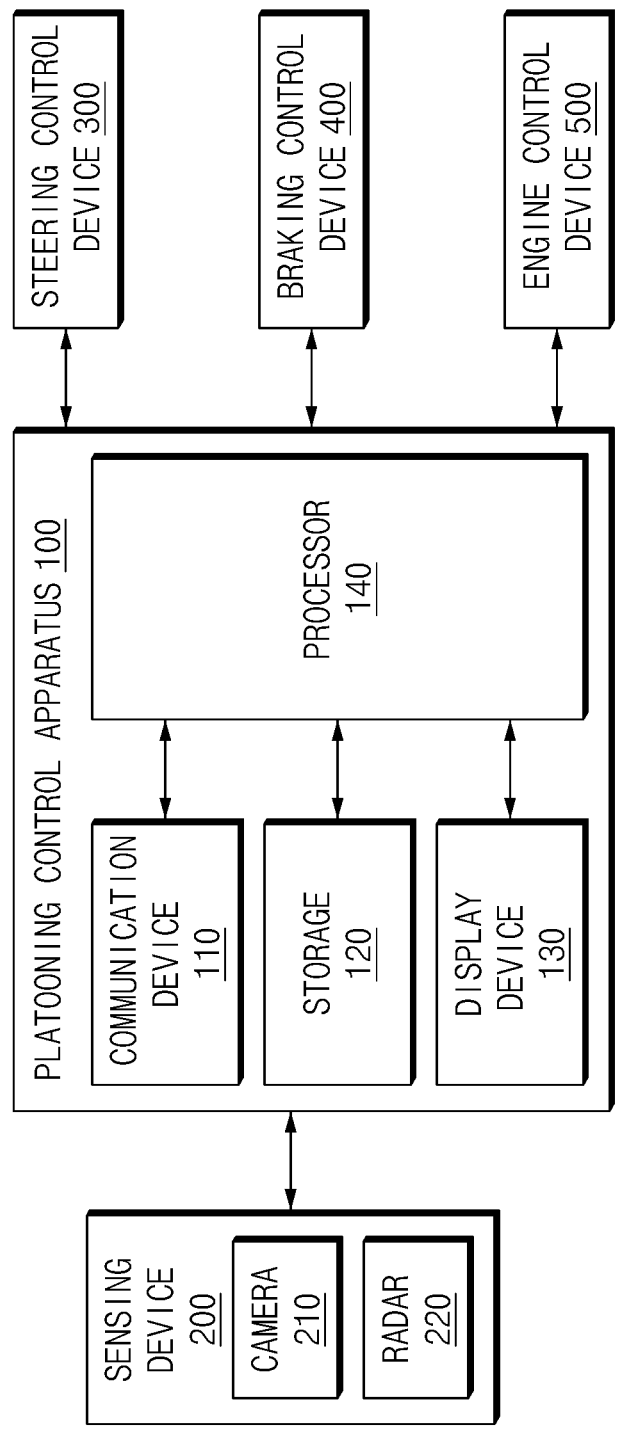
FIG. 2 illustrates a block diagram showing a configuration of a vehicle system including a platooning control apparatus according to various exemplary embodiments of the present invention.

FIG. 2 illustrates a block diagram showing a configuration of a vehicle system including a platooning control apparatus according to various exemplary embodiments of the present invention.

Referring to FIG. 2, the vehicle system according to the exemplary embodiment of the present invention may include a platooning control apparatus 100, a sensing device 200, a steering control device 300, a braking control device 400, and an engine control unit (ECU) 500.

The platooning control apparatus 100 according to the exemplary embodiment of the present invention may be implemented inside the vehicle. In the instant case, the platooning driving control apparatus 100 may be integrally formed with internal control units of the vehicle, or may be implemented as a separate device to be connected to control units of the vehicle by a separate connection means. The platooning control apparatus 100 may be implemented with a cooperative adaptive cruise control (CACC) system or the like combined with a communication technique.

The platooning control apparatus 100 may prevent deterioration of following control performance due to gear shifting and improve intervehicle distance keeping performance between platooning vehicles by receiving whether or not a front vehicle performs the gear shifting through V2V communication and adjusting a feedforward control input of the host vehicle, facilitating stable platooning.

That is, the platooning control apparatus 100 may improve the intervehicle distance keeping performance by reconfiguring the feedforward control based on required acceleration of the vehicle in front to solve a mismatch between the required acceleration of the vehicle in front and actual acceleration of the vehicle in front during gear shifting of the vehicle in front.

The platooning control apparatus 100 may detect occurrence of acceleration and shifting of the vehicle in front based on information received from the vehicle in front during platooning (e.g., the required acceleration of the vehicle in front, a gear command value of the vehicle in front, information related to an engaged gear of the vehicle in front, etc.), and may set a feedforward control input value of the host vehicle to zero for controlling a distance with the vehicle in front in a section in which acceleration and shifting of the vehicle in front occurs.

Furthermore, the platooning control apparatus 100 may gradually change the feedforward control input value of the host vehicle such that the feedforward control input value of the host vehicle reaches the required acceleration received in real time from the vehicle in front when the shifting of the vehicle in front is completed.

Referring to FIG. 2, the lane keeping control apparatus 100 may include a communication device 110, a storage 120, a display device 130, and a processor 140.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, Local Interconnect Network (LIN) communication, flex-ray communication, and the like.

Furthermore, the communication device 110 may perform communication by use of a server, infrastructure, or third vehicles outside the vehicle, and the like through a wireless Internet access or short range communication technique. Herein, the wireless communication technique may include wireless LAN (WLAN), wireless broadband (Wibro), Wi-Fi, Worldwide Interoperability for Microwave Access (WiMAX), etc. Furthermore, short-range communication technique may include Bluetooth, ZigBee, ultra wideband (UWB), radio frequency identification (RFID), infrared data association (IrDA), and the like.

The communication device 110 may perform V2X communication. The V2X communication may include communication between vehicle and all entities such as vehicle-to-vehicle (V2V) communication which refers to communication between vehicles, Vehicle to Infrastructure (V2I) communication which refers to communication between a vehicle and an eNB or road side unit (RSU), vehicle-to-pedestrian (V2P) communication, which refers to communication between user equipment (UE) held by vehicles and individuals (pedestrians, cyclists, vehicle drivers, or passengers), and vehicle-to-network (V2N) communication.

As an example, the communication device 110 may share platooning information by performing the V2V communication between platooning vehicles. In the instant case, the platooning information may include required acceleration, a gear command value, engaged gear information, and information such as a platooning speed, an intervehicle distance, a destination, and a path. The communication device 110 may receive the required acceleration, the gear command value, and the engaged gear information of the vehicle in front from the vehicle in front, and may transmit required acceleration, a gear command value, and engaged gear information of a host vehicle to a rear vehicle.

The storage 120 may store detecting results of the sensing device 200 and data and/or algorithms required for the processor 140 to operate, and the like.

As an example, the storage 120 may store platooning information such as required acceleration, a gear command value, and engaged gear information received through the communication device 110 from vehicles in a platooning vehicle group. Furthermore, the storage 120 may store information related to a front obstacle, e.g., a preceding vehicle detected by the sensing device 200.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The display device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. Furthermore, the input means may include a soft key implemented on the display.

The interface device 130 may be implemented as a head-up display (HUD), a cluster, an audio video navigation (AVN), a human machine interface (HM), a user select menu (USM).

The output device may include a display, and may also include a voice output means such as a speaker. In the instant case, when a touch sensor formed of a touch film, a touch sheet, or a touch pad is provided on the display, the display may operate as a touch screen, and may be implemented in a form in which an input device and an output device are integrated. In various exemplary embodiments of the present invention, the output device may output information related to platooning, such as a distance with a vehicle in front and platooning vehicle group information.

In the instant case, the display may include at least one of a liquid crystal display (LCD), a thin film transistor liquid crystal display (TFT LCD), an organic light emitting diode display (OLED display), a flexible display, a field emission display (FED), and a 3D display.

The processor 140 may be electrically connected to the communication device 110, the storage 120, the display device 130, and the like, may electrically control each component, and may be an electrical circuit that executes software commands, performing various data processing and calculations described below.

The processor 140 may process signals transferred between constituent elements of the platooning control apparatus 100. The processor 140 may be, e.g., an electronic control unit (ECU), a micro controller unit (MCU), or other subcontrollers mounted in the vehicle.

The processor 140 may detect occurrence of acceleration and shifting of the vehicle in front based on information received from the vehicle in front during platooning.

The processor 140 may determine the acceleration situation of the vehicle in front based on the required acceleration of the vehicle in front, and determine the shifting situation of the vehicle in front by use of the gear command value of the vehicle in front and the engaged gear information of the vehicle in front.

That is, the processor 140 may determine that the vehicle in front is in the acceleration situation when a required acceleration of the vehicle in front received from the vehicle in front is greater than 0, and may determine that the shifting has occurred when the gear command value of the vehicle in front received from the vehicle in front and the engaged gear information of the vehicle in front do not match. In the instant case, the gear command value and the engaged gear information do not match due to a time difference between a time point when a driver inputs a gear shifting command a time point when an engaged gear of the vehicle is shifted, and thus the processor 140 may determine that the shifting has occurred when the shifting has occurred when the gear command value of the vehicle in front received from the vehicle in front and the engaged gear information of the vehicle in front do not match.

The processor 140 may set the feedforward control input value of the host vehicle as a required acceleration of the vehicle in front when the vehicle in front is running at a constant speed, decelerating, or is not when shifting has occurred.

The processor 140 may set a feedforward control input value of the host vehicle to zero for controlling an intervehicle distance with the vehicle in front in a section in which acceleration and shifting of the vehicle in front occurs.

That is, in the case where the acceleration and shifting of the vehicle in front occurs, the processor 140 sets and changes the required acceleration of the vehicle in front received from the vehicle in front to zero, so that the required acceleration of the front vehicle is zero, so that the feedforward control input value of the host vehicle may be set to zero.

The actual acceleration occurs after a certain time delay compared to the required acceleration, and thus when shifting occurs while the vehicle in front is accelerating, the required acceleration of the vehicle in front and the actual acceleration of the vehicle in front will be different, and in particular, since power is not transferred, the required acceleration has a positive value, but the actual acceleration falls to zero. Accordingly, according to various exemplary embodiments of the present invention, the required acceleration of the vehicle in front received from the vehicle in front is forcibly set to 0, and the changed required acceleration of the vehicle in front is reflected in the feedforward control of the host vehicle, facilitating faster intervehicle distance control response.

The processor 140 may gradually change the feedforward control input value of the host vehicle such that the feedforward control input value of the host vehicle reaches the required acceleration received in real time from the vehicle in front when the shifting of the vehicle in front is completed.

That is, the processor 140 may compare a maximum jerk value of the host vehicle with the required acceleration of the vehicle in front immediately after the shifting is ended, and when a value obtained by multiplying a maximum jerk value of the host vehicle by an elapsed time after shifting is completed has not reached the required acceleration of the vehicle in front, the feedforward control input value of the host vehicle may be gradually and smoothly increased to reach the required acceleration of the vehicle in front.

The processor 140 may set the feedforward control input value based on the required acceleration of the vehicle in front depending on the acceleration and shifting situations of the vehicle in front, and may perform feedback control by use of the distance with the vehicle in front. In the instant case, the feedback control using an error in the distance with the vehicle in front may be implemented based on a conventional technique.

The sensing device 200 may include one or more sensors that detect an obstacle, e.g., a preceding vehicle, positioned around the host vehicle and measure a distance with the obstacle and/or a relative speed thereof.

The sensing device 200 may include a plurality of sensors to detect an external object of the vehicle, to obtain information related to a position of the external object, a speed of the external object, a moving direction of the external object, and/or a type of the external object (e.g., vehicles, pedestrians, bicycles or motorcycles, etc.). To the present end, the sensing device 200 may further include an ultrasonic sensor, a laser scanner and/or a corner radar, a Light Detection and Ranging (LiDAR), an acceleration sensor, a yaw rate sensor, a torque measurement sensor and/or a wheel speed sensor, a steering angle sensor, and the like in addition to the camera 210 and the radar 220.

The steering control device 300 may be configured to control a steering angle of a vehicle, and may include a steering wheel, an actuator interlocked with the steering wheel, and a controller configured for controlling the actuator.

The braking control device 400 may be configured to control braking of the vehicle, and may include a controller that is configured to control a brake thereof.

The engine control unit (ECU) 500 may be configured to control engine driving of a vehicle, and may include a controller that is configured to control a speed of the vehicle.

Figure 3:
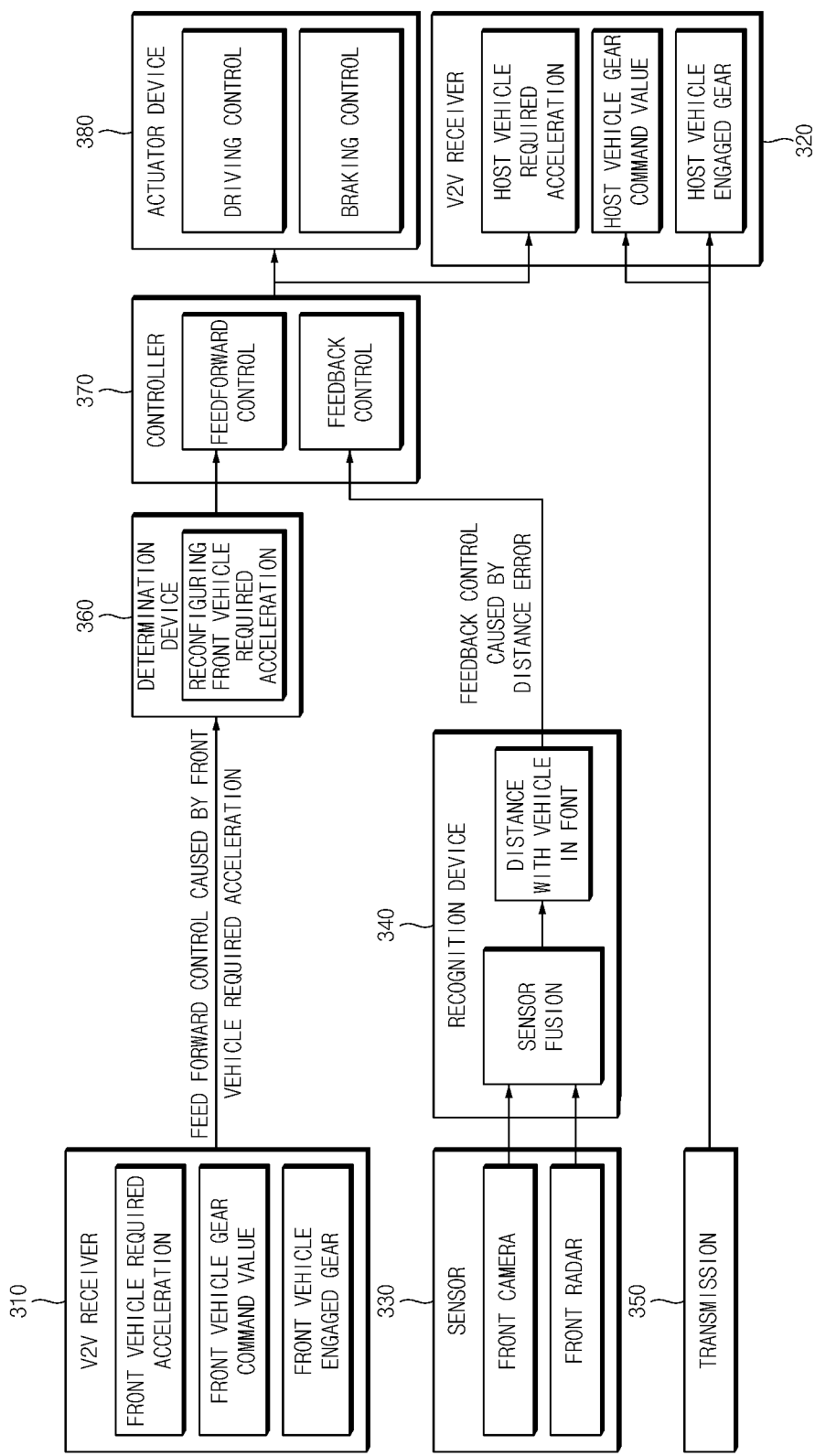
FIG. 3 illustrates a block diagram for describing a processing operation of a platooning control apparatus according to various exemplary embodiments of the present invention.

FIG. 3 illustrates a block diagram for describing a processing operation of a platooning control apparatus according to various exemplary embodiments of the present invention.

Referring to FIG. 3, the platooning control apparatus according to the exemplary embodiment of the present invention includes a V2V receiver 310, a V2V transmitter 320, a sensor 330, a recognition device 340, a transmission 350, and a determination device 360, a controller 370, and an actuator device 380.

The V2V receiver 310 may receive required acceleration of the vehicle in front, a gear command value of the vehicle in front, and engaged gear information of the vehicle in front from the vehicle in front.

The V2V transmitter 320 may transmit the required acceleration of the host vehicle, the gear command value of the host vehicle, and the engaged gear information of the host vehicle to the platooning vehicles.

The sensor 330 may include a front camera and a front radar, and may detect a distance with a vehicle in front.

The recognition device 340 may fusion information received from the sensor 330, determine a distance with a vehicle in front, and transmit it to the controller 370.

The transmission 350 may provide a gear command value of the host vehicle and engaged gear information of the host vehicle to the V2V transmitter 320.

The determination device 360 determines a feedforward control input value based on the required acceleration of the vehicle in front, the gear command value of the vehicle in front, and the engaged gear information of the vehicle in front to perform feedforward control reflecting the required acceleration of the vehicle in front received through the V2V receiver 310.

The controller 370 may perform feedforward control based on the feedforward control input determined by the determination device 360, and may determine the required acceleration of the host vehicle by performing feedback control using the distance with the vehicle in front recognized by the sensor 330. In the instant case, the feedback control by a distance error using the distance with the vehicle in front may be performed based on a conventional technique. The feedforward control of the controller 370 may be the same as the feedforward control by the processor 140 of FIG. 2.

The actuator device 380 may perform driving or braking control of the host vehicle by use of a required acceleration value of the host vehicle.

Figure 4:
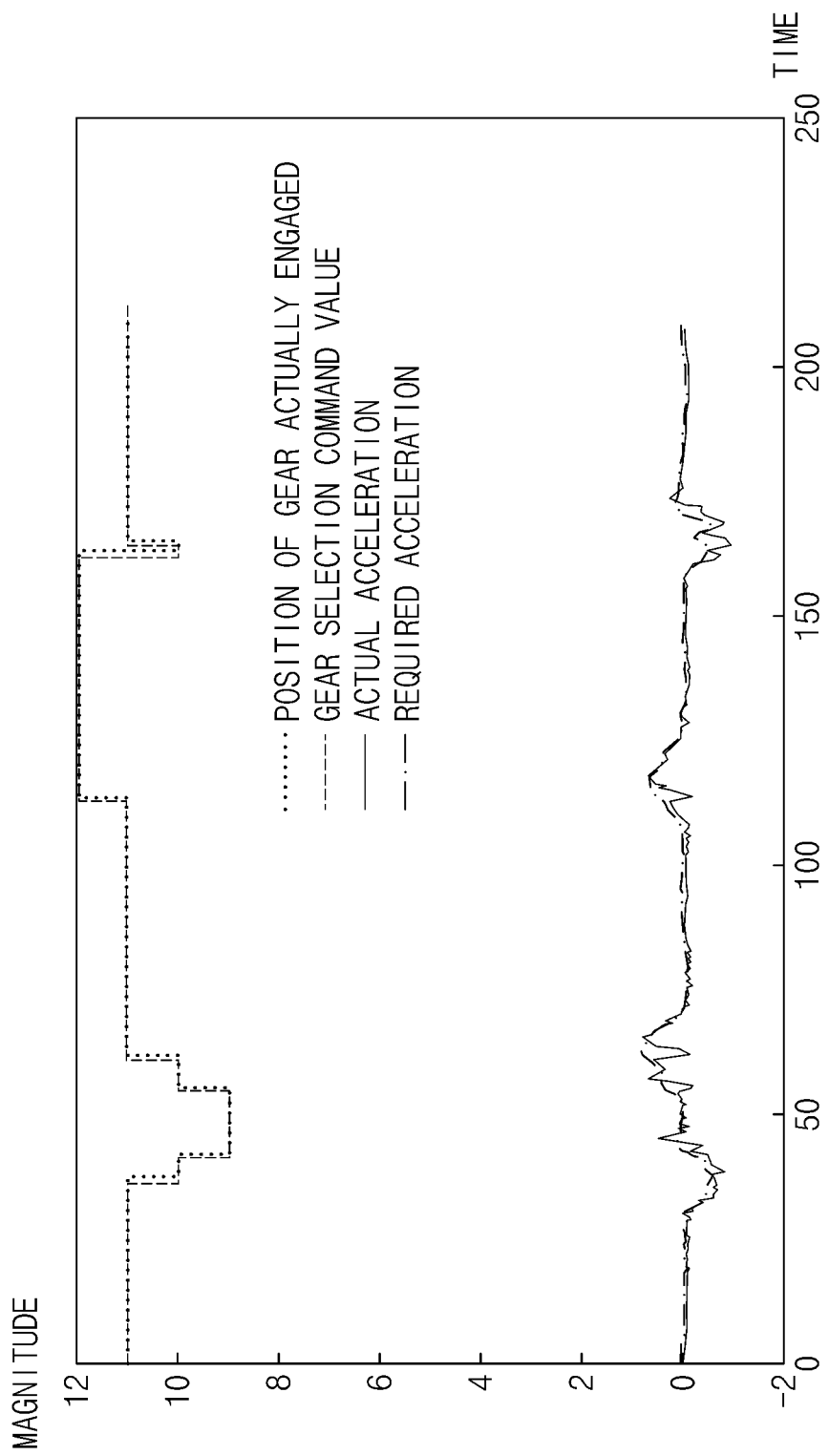
FIG. 4 illustrates a view for describing changes in acceleration and shift sections during platooning according to various exemplary embodiments of the present invention.

FIG. 4 illustrates a view for describing changes in acceleration and shift sections during platooning according to various exemplary embodiments of the present invention.

Referring to FIG. 4, the required acceleration and the actual acceleration are different in a section in which shifting occurs while accelerating. That is, since power cannot be transmitted in a section in which the shifting occurs while accelerating, the actual acceleration drops to zero even when the required acceleration has a positive value.

Accordingly, the rear vehicle attempts to accelerate because the required acceleration of the vehicle in front received from the vehicle in front has a positive value, but the actual acceleration of the vehicle in front drops to zero, making it difficult to keep the distance between the vehicle in front and the rear vehicle.

Accordingly, in a section in which shifting occurs while the vehicle in front accelerates, the rear vehicle is controlled to keep a constant distance between vehicles by forcibly setting the required acceleration of the vehicle in front to 0 and setting the feedforward control input of the host vehicle to 0.

Furthermore, the required acceleration of the vehicle in front, which is the feedforward control input value, may smoothly be increased from 0 to the required acceleration value of the vehicle in front received through V2V communication, minimizing abrupt changes in an intervehicle distance control command.

Figure 5:
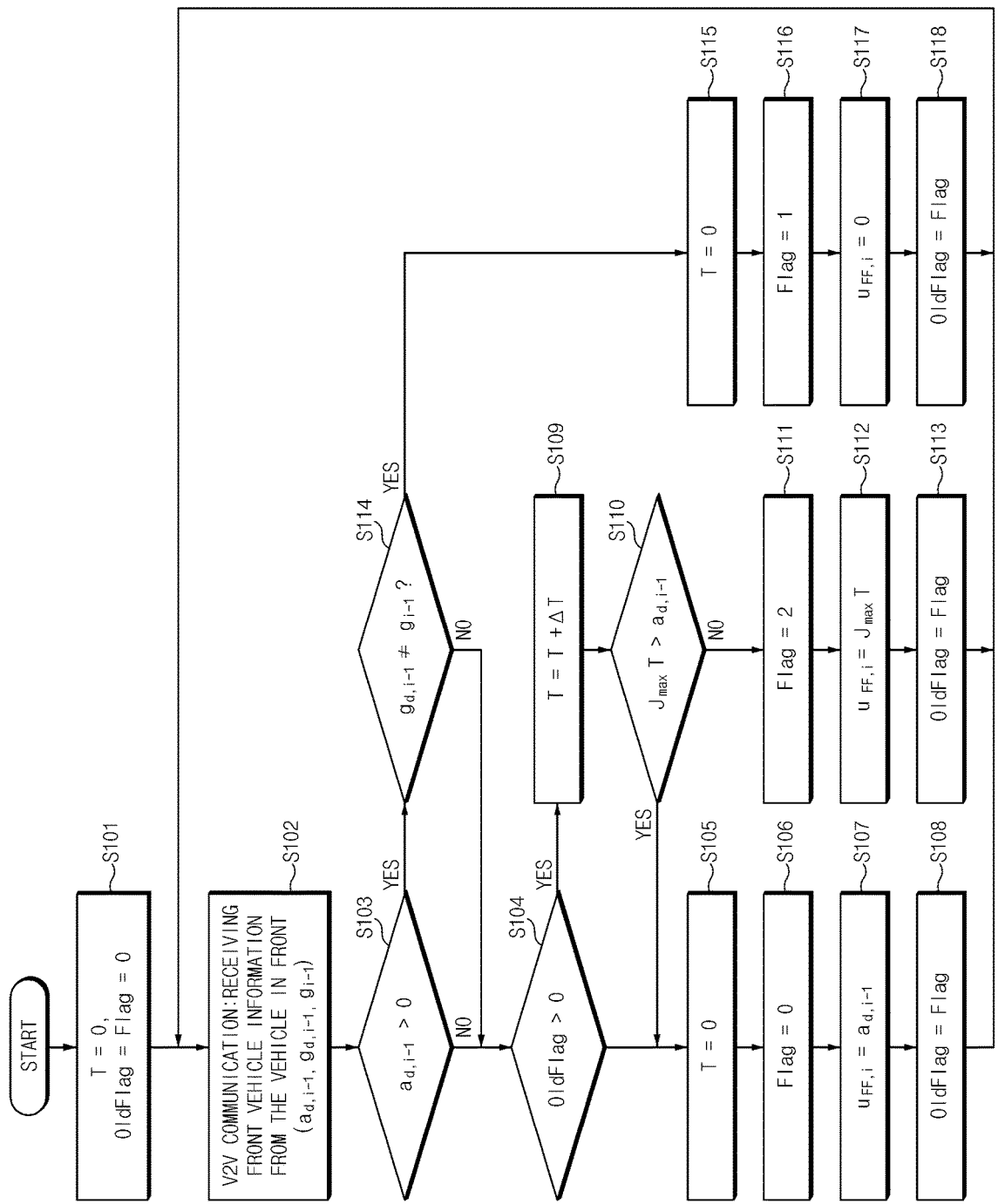
FIG. 5 illustrates a platooning control method according to various exemplary embodiments of the present invention.

Hereinafter, a platooning control method according to various exemplary embodiments of the present invention will be described in detail with reference to FIG. 5. FIG. 5 illustrates a platooning control method according to various exemplary embodiments of the present invention.

Hereinafter, it is assumed that the platooning control apparatus 100 of the of FIG. 2 performs processes of FIG. 5. Furthermore, in the description of FIG. 5, operations referred to as being performed by a device may be understood as being controlled by the processor 140 of the platooning control apparatus 100.

Referring to FIG. 5, the platooning control apparatus 100 starts platooning, and is set to T=0 and OldFlag=Flag=0 (S101). In the instant case, T denotes a time taken to increase the feedforward control input value from 0 to the required acceleration value of the vehicle in front. Flag is a factor indicating a feedforward control step, and OldFlag is a factor indicating the feedforward control step in a previous flow. OldFlag and Flag are all set to 0 at a beginning of platooning.

The platooning control apparatus 100 receives front vehicle information from the vehicle in front through V2V communication (S102). In the instant case, the front vehicle information may include a front vehicle required acceleration $a_{d,i-1}$, a front vehicle gear command value $g_{d,i-1}$, and a front vehicle engaged gear $g_{i-1}$.

The platooning control apparatus 100 determines whether the required acceleration $a_{d,i-1}$ of the vehicle in front is greater than 0 (S103). That is, the platooning control apparatus 100 may determine whether the vehicle in front is accelerating.

Accordingly, when the required acceleration of the vehicle in front $a_{d,i-1}$ is smaller than 0, the platooning control apparatus 100 determines that the vehicle in front is not accelerating, and determines whether the OldFlag is greater than 0 (S104). When OldFlag is greater than 0, that is, when OldFlag is 1 or 2, it is determined that in the previous flow, the flag is progressing to 1 or 2, and the required acceleration of the vehicle in front is gradually increased from 0 to the actual required acceleration value of the vehicle in front.

When OldFlag is smaller than or equal to 0, the platooning control apparatus 100 may set the feedforward control input as a required acceleration value of the vehicle in front as a case where the vehicle in front is not accelerating (driving at a constant speed or decelerating) or is not in a shifting process.

That is, the platooning control apparatus 100 sets T=0 (S105), Flag=0 (S106), and sets a host vehicle feedforward control input value $u_{FF,i}$ as a front vehicle required acceleration $a_{d,i-1}$ (S107).

Subsequently, the platooning control apparatus 100 sets OldFlag=Flag (S108), returns to step S102, and repeats the processes of step S102 or less.

On the other hand, in S104, when OldFlag is greater than 0, that is, when OldFlag is 1 or 2, the platooning control apparatus 100 determines a new T by summing T and a system operation period ΔT (S109).

Subsequently, the platooning control apparatus 100 determines whether a product of a host vehicle maximum jerk value $J_{max}$ and T is greater than a front vehicle required acceleration $a_{d,i-1}$ (S110), and performs processes of steps S105 or less when the product of the host vehicle maximum jerk value $J_{max}$ and T is greater than the front vehicle required acceleration $a_{d,i-1}$. That is, the platooning control apparatus 100 sets the feedforward control input as a required acceleration value of the vehicle in front as in a case where the vehicle in front is not accelerating or is not in the shifting process.

The platooning control apparatus 100 sets Flag=2 when the product of the host vehicle maximum jerk value $J_{max}$ and T is equal to or smaller than the front vehicle required acceleration $a_{d,i-1}$ (S111).

When Flag=2, the platooning control apparatus 100 smoothly increases the host vehicle feedforward control input value $u_{FF,i}$ from zero to the front vehicle required acceleration $a_{d,i-1}$ as a situation immediately after shifting while accelerating.

Subsequently, the platooning control apparatus 100 sets OldFlag=Flag (S113), returns to step S102, and repeats the processes of step S102 or less.

Meanwhile, in the process S103, when the front vehicle required acceleration $a_{d,i-1}$ is greater than 0, the platooning control apparatus 100 determines whether a front vehicle gear command value $g_{d,i-1}$ is different from a front vehicle engaged gear $g_{i-1}$ (S114).

Accordingly, the platooning control apparatus 100 repeats the processes of step S104 or less (S115) when the front vehicle gear command value $g_{d,i-1}$ is the same as the front vehicle engaged gear $g_{i-1}$, and sets Flag=1 (S116) when the front vehicle gear command value $g_{d,i-1}$ is different from the front vehicle engaged gear $g_{i-1}$.

When Flag=1, the platooning control apparatus 100 sets a host vehicle feedforward control input value $u_{FF,i}$ to 0 as a situation in which shifting occurs while accelerating (S117). As in the description of FIG. 4, the rear vehicle tries to accelerate because the required acceleration of the vehicle in front received from the vehicle in front is positive, but since the actual acceleration of the vehicle in front drops to 0, it becomes difficult to keep the distance between the vehicle in front and the rear vehicle, and thus the required acceleration of the vehicle in front is forcibly set to 0 and the feedforward control input of the host vehicle is set to 0.

Subsequently, the platooning control apparatus 100 sets OldFlag=Flag (S118), returns to step S102, and repeats the processes of step S102 or less.

Accordingly, according to various exemplary embodiments of the present invention, even when the shifting of the platooning vehicles suddenly occurs during platooning, it is possible to improve the performance of keeping the distance between vehicles by solving a mismatch between the required acceleration and the actual acceleration in the gear shifting of the vehicle in front and reflecting the characteristic in which no power is transmitted to the final required acceleration when the vehicle in front accelerates and shifts gears. Accordingly, according to various exemplary embodiments of the present invention, it is possible to prevent a dangerous situation in which the distance between vehicles is unintentionally shorter than the control target distance during platooning.

Figure 6:
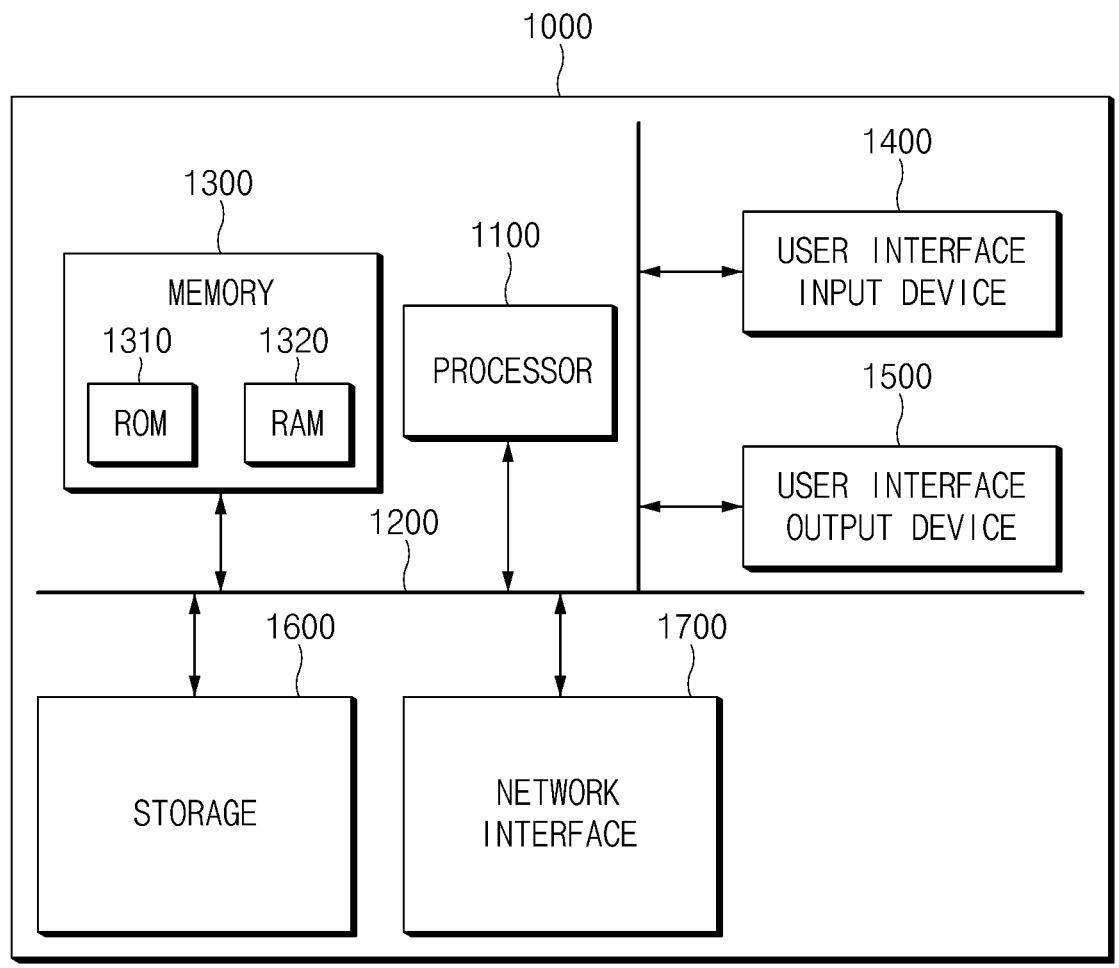
FIG. 6 illustrates a computing system according to various exemplary embodiments of the present invention.

FIG. 6 illustrates a computing system according to various exemplary embodiments of the present invention.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A platooning control apparatus comprising:
   a processor configured to detect occurrence of acceleration and shifting of a vehicle in front of a host vehicle based on information received from the vehicle in front during platooning, and to set a feedforward control input value of the host vehicle to zero for controlling an intervehicle distance with the vehicle in front in a section in which the acceleration and the shifting of the vehicle in front occurs; and
   a storage configured to store data and algorithms driven by the processor.

2. The platooning control apparatus of claim 1, wherein the processor is configured to increase the feedforward control input value of the host vehicle so that the feedforward control input value of the host vehicle reaches a required acceleration in real time received from the vehicle in front when the shifting of the vehicle in front is finished.

3. The platooning control apparatus of claim 1, wherein the processor is configured to determine that the vehicle in front is in an acceleration situation when a required acceleration of the vehicle in front received from the vehicle in front is greater than 0.

4. The platooning control apparatus of claim 1, wherein the processor is configured to determine that the shifting occurs when a gear command value of the vehicle in front received from the vehicle in front and engaged gear information of the vehicle in front do not match each other.

5. The platooning control apparatus of claim 1, wherein the processor is configured to set the feedforward control input value of the host vehicle as a required acceleration of the vehicle in front when the vehicle in front is running at a constant speed, decelerating, or is not when the shifting has occurred.

6. The platooning control apparatus of claim 1, wherein the processor is configured to set and change a required acceleration of the vehicle in front received from the vehicle in front to zero to set the feedforward control input value of the host vehicle to zero in the section where the acceleration and the shifting of the vehicle in front occurs.

7. The platooning control apparatus of claim 1, wherein the processor is configured to compare a value obtained by multiplying a maximum jerk value of the host vehicle by an elapsed time after the shifting is completed with a required acceleration of the vehicle in front immediately after the shifting is ended.

8. The platooning control apparatus of claim 7, wherein the processor is configured to increase the feedforward control input value of the host vehicle to reach the required acceleration of the vehicle in front when the value obtained by multiplying the maximum jerk value of the host vehicle by the elapsed time after the shifting is completed has not reached the required acceleration of the vehicle in front.

9. The platooning control apparatus of claim 1, wherein the processor is configured to set the feedforward control input value based on a required acceleration of the vehicle in front depending on acceleration and shifting situations of the vehicle in front, and to perform feedback control by use of the intervehicle distance with the vehicle in front.

10. The platooning control apparatus of claim 1, further including:
    a communication device configured to perform V2V communication between platooning vehicles.

11. A vehicle system comprising:
    a platooning control apparatus configured to detect occurrence of acceleration and shifting of a vehicle in front of a host vehicle based on information received from the vehicle in front during platooning, and to set a feedforward control input value of the host vehicle to zero for controlling an intervehicle distance with the vehicle in front in a section in which the acceleration and the shifting of the vehicle in front occurs; and
    a driving device configured to control the host vehicle depending on the feedforward control input value of the host vehicle to keep the intervehicle distance with the vehicle in front.

12. The vehicle system of claim 11, further including:
    a sensing device configured to detect the intervehicle distance with the vehicle in front.

13. The vehicle system of claim 12, wherein the platooning control apparatus is configured to set the feedforward control input value based on a required acceleration of the vehicle in front depending on acceleration and shifting situations of the vehicle in front, and to perform feedback control by use of the intervehicle distance with the vehicle in front.

14. The vehicle system of claim 11, wherein the platooning control apparatus is configured to increase the feedforward control input value of the host vehicle so that the feedforward control input value of the host vehicle reaches a required acceleration received from the vehicle in front in real time when the shifting of the vehicle in front is finished.

15. A platooning control method comprising:
    detecting occurrence of acceleration and shifting of a vehicle in front of a host vehicle based on information received from the vehicle in front during platooning; and
    setting, by a processor, a feedforward control input value of the host vehicle to zero for controlling an intervehicle distance with the vehicle in front in a section in which the acceleration and the shifting of the vehicle in front occurs.

16. The platooning control method of claim 15, wherein the detecting of the occurrence of the acceleration and the shifting of the vehicle in front includes:
    receiving, by the processor, a required acceleration of the vehicle in front, a gear command value of the vehicle in front, and engaged gear information of the vehicle in front from the vehicle in front.

17. The platooning control method of claim 16, wherein the detecting of the occurrence of the acceleration and the shifting of the vehicle in front includes:
   determining, by the processor, an acceleration situation of the vehicle in front based on the required acceleration of the vehicle in front; and
   determining, by the processor, a shifting situation of the vehicle in front by use of the gear command value of the vehicle in front and the engaged gear information of the vehicle in front.

18. The platooning control method of claim 15, further including:
   increasing, by the processor, the feedforward control input value of the host vehicle so that the feedforward control input value of the host vehicle reaches a required acceleration received from the vehicle in front in real time when the shifting of the vehicle in front is finished.

19. The platooning control method of claim 18, wherein the increasing of the feedforward control input value of the host vehicle includes:
   comparing, by the processor, a value obtained by multiplying a maximum jerk value of the host vehicle by an elapsed time after the shifting is completed with the required acceleration of the vehicle in front after the shifting is ended; and
   increasing, by the processor, the feedforward control input value of the host vehicle to reach the required acceleration of the vehicle in front when the value obtained by multiplying the maximum jerk value of the host vehicle by the elapsed time after the shifting is completed has not reached the required acceleration of the vehicle in front.

20. The platooning control method of claim 15, further including
   setting, by the processor, the feedforward control input value of the host vehicle as a required acceleration of the vehicle in front when the vehicle in front is running at a constant speed, decelerating, or is not when the shifting has occurred.

\* \* \* \* \*